E. H. FARMER.
PHOTOGRAPHIC CAMERA.
APPLICATION FILED OCT. 22, 1917.
1,291,452.
Patented Jan. 14, 1919.
2 SHEETS—SHEET 1.
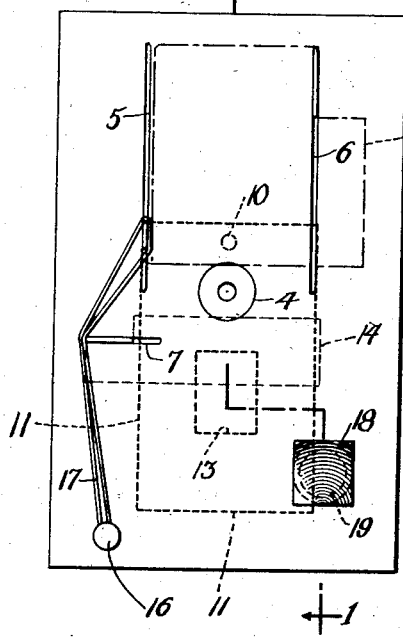
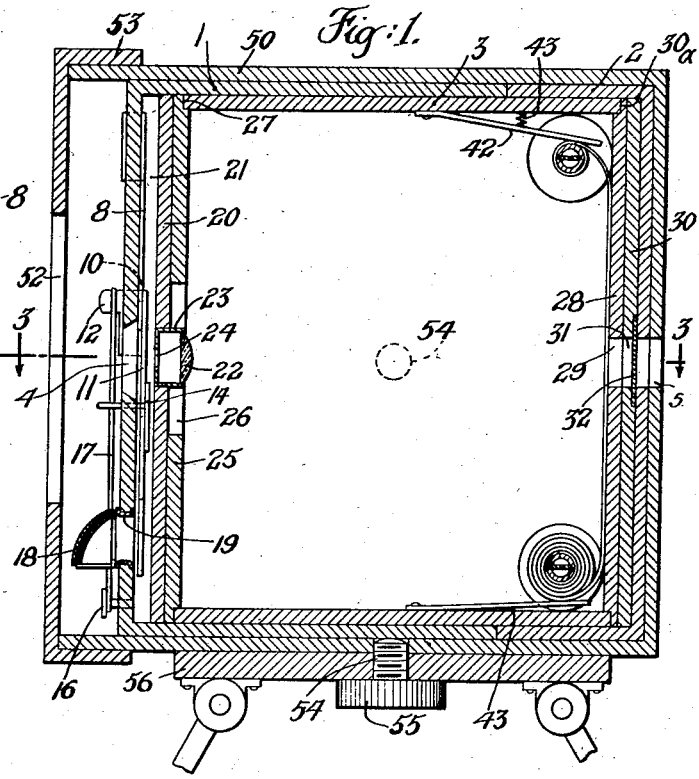
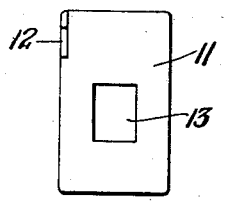
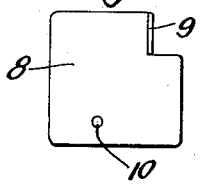
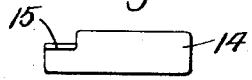
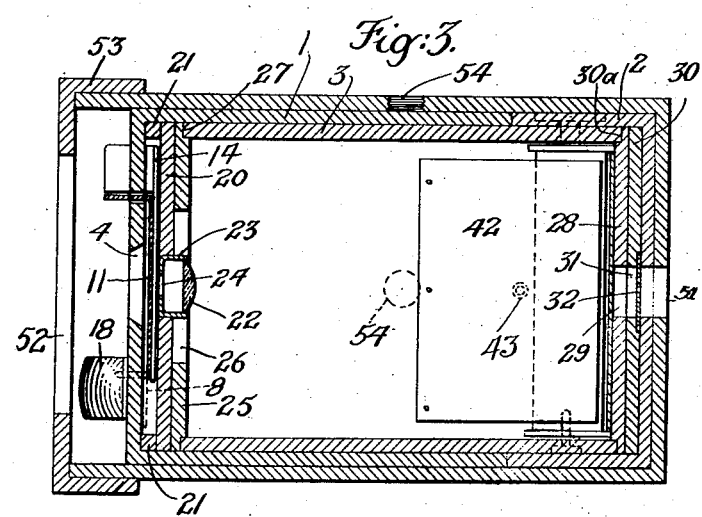
INVENTOR
Ernest H. Farmer
BY Whitaker Prevost
ATTORNEYS.

E. H. FARMER.
PHOTOGRAPHIC CAMERA.
APPLICATION FILED OCT. 22, 1917.
1,291,452.
Patented Jan. 14, 1919.
2 SHEETS—SHEET 2.
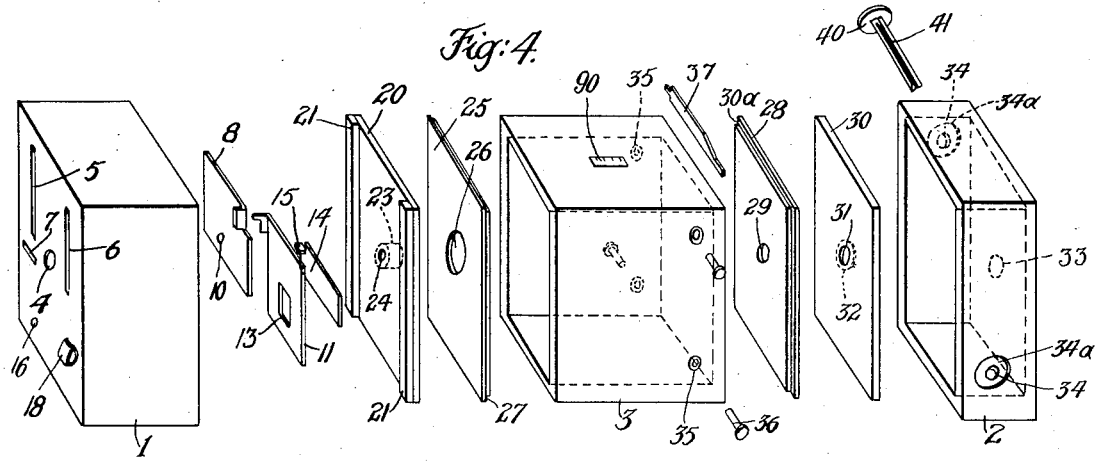
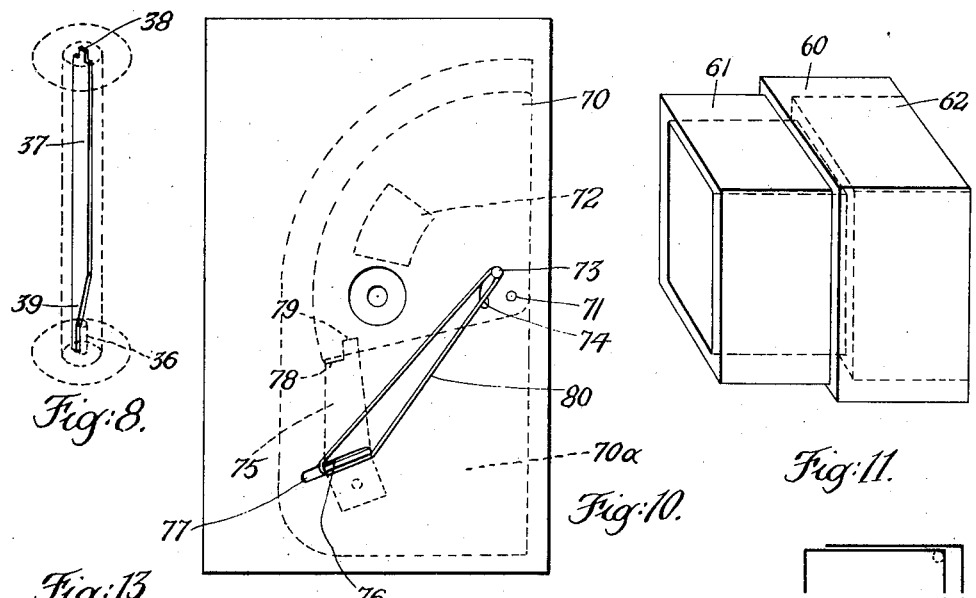
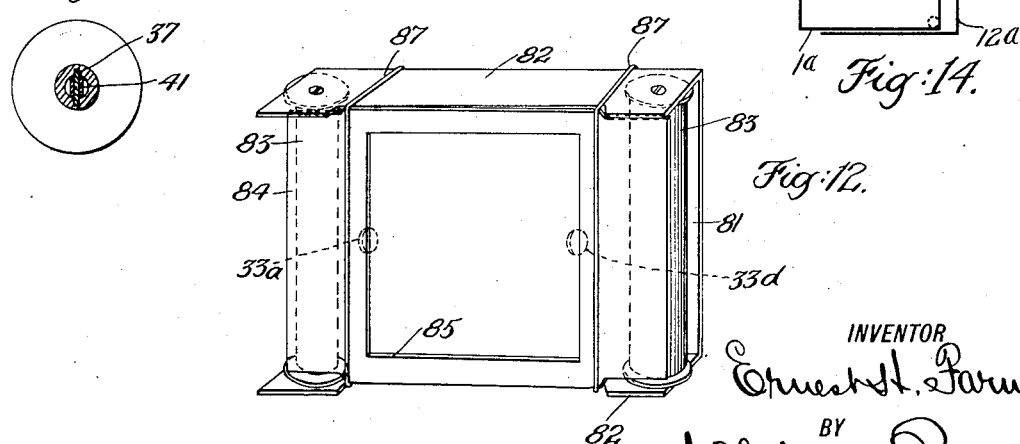
INVENTOR
Ernest H. Farmer
BY
Whitaker Prevost
ATTORNEYS.

UNITED STATES PATENT OFFICE.

ERNEST HOWARD FARMER, OF LONDON, ENGLAND.

PHOTOGRAPHIC CAMERA.

1,291,452.  Specification of Letters Patent.  Patented Jan. 14, 1919.

Application filed October 22, 1917. Serial No. 197,789.

*To all whom it may concern:*

Be it known that I, ERNEST HOWARD FARMER, a subject of the King of Great Britain, residing at London, in the county of Middlesex, England, have invented certain new and useful Improvements in Photographic Cameras; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of the invention, selected by me for purposes of illustration, and certain slight modifications thereof, and the said invention is fully disclosed in the following description and claims.

My invention has for its object to greatly simplify the construction and cheapen the cost of production of small, portable cameras, while at the same time increasing the efficiency thereof in certain respects in which practical experience has shown them to be notably deficient, and to produce a camera capable of being placed on the market at an extremely small price, but which even in its least expensive forms is capable of a much wider variety of use and more effective use than can be obtained with the ordinary hand cameras of commerce.

For example, in the use of hand cameras there is great need for both a wide-angle lens, which has a short focal length, as well as a narrow-angle lens, which has a longer focal length, and as most of such cameras have a fixed focus or a very slight range of adjustment suitable merely to the lens with which it is equipped, it is difficult, if not impossible, to use both types of lens with the same camera. It has been attempted to meet this difficulty by providing an additional lens to be applied to the lens with which the camera is fitted, but this has not proved satisfactory on account of the fixed focal length or limited focal adjustment of the camera.

Ordinary hand cameras are usually provided with small "finders" in which an image formed by a lens is reflected to the eye, and except when photographing highly illuminated subjects which merely require centering, such finders are not very satisfactory, and no adequate means is provided to enable the operator to study the scene to be photographed and to select portions thereof forming an effective composition to be photographed, upon the intelligent selection of which, the entire artistic and technical quality of the photograph depends.

In the use of cartridge films in hand cameras, it is usual to leave a portion of the film between exposures exposed to the atmosphere within the camera, where it is apt to develop dust, spots and fog. Again, the lens of the camera frequently becomes dimmed with a deposit from the atmosphere, and there is no way in which it can be removed for cleaning after a film has been placed in the camera, until the film has been entirely exposed and removed.

It is the object of my invention to obviate as far as possible all of these shortcomings of portable cameras and to provide a simple, inexpensive construction in which hand labor in its production and assembly is reduced to a minimum, and in which, if desired, a considerable portion of the assembly of the parts of the camera may be left to the user after purchasing.

To this end my invention contemplates a camera body comprising a front and a rear section, each of which is closed at one end and open at the other, and an intermediate sleeve which may be separate from both front and rear members, or connected to one of them, and which is made to snugly fit within or upon the front and rear members, or within one and upon the other, so as to form a light-tight structure, the parts fitting together like the parts of a well constructed pasteboard or other box, and being capable of being separated at any time to give access to the interior. The front section of the camera carries a lens and shutter, while another section, preferably the sleeve, is provided with means for supporting film spools, each of which may be operated from the exterior so that the film may be rolled entirely back or forward upon a single roll between exposures, and protected from light, dust and atmospheric conditions after each exposure, if desired, and thus permitting the separation of the parts of the camera at any time for the removal of the lens for cleaning, or for the substitution of a lens of different character. My invention also contemplates the use of intermediate sleeves of different length to be inserted between the front and rear sections, in lieu of the intermediate sleeve or in addition thereto, for the purpose of varying the focal length of the camera to adapt it for use with lenses of varying focal length. Thus several lenses of different focal length, together with the appropriate spacing sleeve suitable to each, may be furnished with a single camera, or be obtained for use therewith. My invention also contemplates the provision on the camera of a convex mirror so located that the actual scene covered by the lens may be seen, thus enabling the operator to use it in viewing objects of weak or low illumination as well as brilliantly illuminated objects, as the light is directly reflected from the mirror to the eye of the operator and does not have to pass through a lens. The mirror is preferably mounted rotatably upon the front of the camera so that it may be rotated into proper position for use whether the camera is held with one axis vertical or the other.

My invention also contemplates the provision in connection with the camera of a composing device comprising a removable, exterior case, fitting the outside of the camera snugly, with a guiding fit, and which may be the carrying case for the camera. This composing device is provided with an eye aperture in one wall and an aperture in the opposite wall, the relation between these two apertures being such that the operator may apply his eye to the eye aperture and through the view aperture opposite see the identical scene which would be covered by the lens of the particular camera with which the composing device is supplied, if placed in the same position. This composing device can be used in the hand in the study of the landscape or view for the better selection of the artistic composition, and it may also be attached to a tripod or support so that when the desired view has been selected, the position of the composing device may be fixed and the camera may then be inserted within the composing device and the identical selected view be photographed. When it is required to see the picture up to the moment before exposure, the composer and camera may be placed side by side or one over the other on the tripod.

My invention also contemplates certain details in the construction of the camera and the provision for means for supporting and winding the film and other details, all of which are hereinafter fully set forth and illustrated in the accompanying drawings.

Referring to said drawings:

Figure 1 represents a vertical, longitudinal, sectional view of a camera embodying my invention taken on line 1—1 of Fig. 2, and showing it held within the composing device, the latter being fixed upon a tripod, portions of which are broken away.

Fig. 2 is a front elevation of the camera detached from the composing device, and illustrating in full and dotted lines the location of the shutters and their actuating and controlling means, and also showing the convex mirror.

Fig. 3 is a horizontal transverse section of the camera and composing device on the line 3—3 of Fig. 1.

Fig. 4 is a detailed perspective view illustrating the various parts of the camera detached.

Fig. 5 is a detailed view of the exposing shutter detached.

Fig. 6 is a detailed view of the safety shutter.

Fig. 7 is a detailed view of the device for locking and releasing the exposing shutter.

Fig. 8 is a detailed perspective view of a winding plate which may be inserted within one or both of the film rolls or spools and operated in conjunction with a winding key for winding the film, a spool and one of the center pins therefor being illustrated in dotted lines.

Fig. 9 is a detailed view of a winding key, which may be conveniently used in connection with the winding plate illustrated in Fig. 8.

Fig. 10 represents a front view of the camera similar to Fig. 2, showing a modified form of exposing shutter and locking and releasing means therefor.

Fig. 11 is a detailed view of one form of spacing sleeve which may be employed to increase the focal length of the camera when desired.

Fig. 12 is a detailed view of a film roll unit which may be conveniently employed in connection with my improved camera.

Fig. 13 represents a cross-sectional view through a film spool, showing the positions of the winding plate illustrated in Fig. 8, and the stem portions of the key shown in Fig. 9 when applied to the spool.

Fig. 14 is a diagrammatic view showing a modification of my improved camera in which the sleeve and one of the members, either the front or rear member, are merged in one.

Referring to the drawings, Figs. 1, 2, 3 and 4 show one embodiment of my invention, which I have selected for purposes of illustration. In these figures, 1 represents the front member, 2 the rear member, and 3 the sleeve, which is in this instance of slightly reduced cross-section and snugly fits within the front and rear members, the edges of which meet when placed in operative position for the principal or fixed focus. Each of the members, 1 and 2, is closed at one end and open at the other to receive a portion of the sleeve 3. The members 1, 2 and 3 are preferably made of cardboard covered with a suitable covering such as leatherette paper, although in more expensive forms of the apparatus they may be made of wood or any suitable metal, and covered with leather, etc., according to the style and finish desired, but in the simplest and least expensive form I prefer to make the entire camera, so far as possible, of pasteboard.

The front member (1) is provided with a central aperture 4 and with a pair of parallel slots, (5 and 6) and a shorter slot (7) disposed perpendicularly to and slightly below the slot (5), for the accommodation of projecting parts of the shutters and controlling mechanism therefor. This shutter mechanism is of the simplest character, both as to construction and operation, and yet it is capable of a wide range of useful operation. I prefer to provide a safety shutter (8), illustrated in detail in Fig. 6, which comprises a flat sheet or plate of cardboard or metal, preferably metal, having a struck-up projection or finger piece (9), which engages the slot (6) in the front member (1), and is of sufficient length to serve as a guide for the movement of the safety shutter. In the highest position permitted by the slot (6), shutter (8) clears the lens opening, and in the lowest position it completely closes this opening. The shutter (8) is also provided with a diaphragm opening (10), which in the intermediate position of the safety shutter is brought into alinement with the opening (4) to reduce the amount of light admitted to the lens. As will be seen hereafter, this shutter is held frictionally in any position to which it is or may be moved.

11 represents the exposing shutter, which consists of a flat plate similar to shutter (8), and preferably of metal, provided with a struck-up projection (12) adapted to engage the slot (5) in member (1) and serve as a guide and finger piece. The shutter (11) is provided with an exposure opening (13) of suitable size for exposing the lens in passing from one extreme position to the other. The shutter (11) can be moved by hand at any rate of speed desired across the lens opening to give the desired exposure.

I also provide means for operating the shutter more swiftly for instantaneous exposures when desired, and to this end I provide a locking and releasing device (14), shown in detail in Fig. 7, which is provided with a struck-up projection (15), adapted to engage the transverse slot (7) in member (1). This projection (15) is so located that when the shutter (11) is moved to the position to bring the projection (12) to the outermost end of the slot (5), projection (15) may be pushed beneath the lower end of the shutter and hold it in this position. I provide on the front of the camera a button or projection (16), and when it is desired to operate the shutter (11) for making instantaneous exposures, an ordinary rubber band (17) is passed around the button (16) at one end and the other end is carried outside of the locking projection (15) and placed over the projection (12) on the shutter. This rubber band will now tend to force the shutter from one extreme position to the other with a force depending on the particular rubber band selected, while it will also tend to hold the locking projection (15) beneath the shutter when the shutter is in set position. By moving the projection (15) outwardly the shutter will be released and will be quickly drawn across the lens opening. By using rubber bands of different strength, any desired rapidity of operation may be readily obtained.

The front member (1) is also provided with a convex mirror indicated at 18, which is preferably formed of metal of the proper form and surface, and is preferably mounted rotatably with respect to the front of member (1). I find it convenient to secure the mirror by soldering or otherwise to a long pin which rotates in the camera wall, or as shown, to an eyelet (19), which can be passed through the material of which the outer end of member (1) is composed and clenched lightly on the inside so as to firmly support the mirror while permitting it to be rotated to accommodate it to the position in which the camera is held.

The member (1) is provided with a lens in line with the opening (4) and I prefer to attach the lens to a separate plate, preferably pasteboard, indicated at (20), which is stamped out so as to exactly fit the interior of member (1) and be frictionally held tightly therein. I prefer to provide the front face of plate (20) with spacing strips of pasteboard or other suitable material, indicated at (21), to accommodate the plates pertaining to the shutter mechanism previously described, and I find it convenient to mount the lens (22) in a suitable tubular holder (23), which is also provided with a diaphragm (24) of larger diameter than the diaphragm (10) in plate (8), the said tubular holder being held frictionally in the aperture in plate (20) or secured therein in any desired way.

In assembling the parts thus far described with relation to member (1), it will be seen that if the member (1) is held with its closed end in horizontal position and its open end upward, the shutter plates (8) and (11) and the locking and releasing plate (14) can be dropped into position with their projecting portions extending through the slots (5), (6) and (7), and the plate (20) carrying the lens can then be forced frictionally into position, thereby securing the several plates of the shutter mechanism in operative relation, and I prefer to so construct the parts that when they are assembled there will be a slight frictional engagement at all times between the plates of the shutter mechanism and the walls of the member (1) and plate (20) between which they are thus held, so that they will remain in any position to which they are moved unless actuated by the finger or by a spring-actuating device like the rubber band described.

The sleeve member (3) of the camera is preferably formed separate from members (1) and (2), as indicated in Fig. (4), and is made of cardboard and covered with leatherette paper or other suitable covering. The sleeve is preferably made so that it can be folded flat when not in use, although this is not essential. When so made it is preferably held in open position by an end plate indicated at (25), provided with a central opening (26) larger in diameter than the lens so as not to interfere with the light passing through the lens, and it preferably has its edges rabbeted, as indicated at (27), to provide a portion of small cross-section which fits into the upward end of the sleeve. This plate (25) is also preferably made of cardboard, and the rabbet (27) is pressed, cut, or otherwise formed thereon. This rabbet assists in making the construction light-tight in addition to the telescopic union between the sleeve and the member (1). In some instances the plate (25) may be dispensed with and the rabbet (27) formed on the rear edge of the lens holding plate (20), if desired, and the end plate, whether the plate (20) or (25), may be permanently united with the sleeve by gluing or otherwise, if it is desired, in which case all three members (1), (2) and (3) would be formed with one end closed and the other open. I prefer, however, to form the parts as shown in Fig. (4). It will be understood that the plate (25) is stamped or cut to exactly fit the interior of the member (1), and after the shutter mechanism and lens plate have been put in position plate (25) is pressed into the member (1) and held frictionally therein immediately in the rear of the lens plate, after which the sleeve (3) is pushed into the member (1) until it engages the rabbet (27). I also prefer to provide the sleeve (3) with a similar end plate (28) at the rear end, provided with a small central aperture (29) and a rabbet (30), but this plate may be omitted, if desired, although I prefer to use it. This end plate (28) is so formed as to snugly fit the rear member (2), which also receives a plate (30) having a central aperture (31) covered by a small piece of transparent material (32), which will not transmit actinic rays, such as a piece of thin, red glass or celluloid or the like, which is glued or otherwise secured thereto before the plate (30) is forced into the member (2) which it frictionally fits. The member (2) is provided in its rear wall with a small aperture (33) registering with the apertures (29) and (31) above-mentioned, through which the numeral on the rear face of the paper backing for the film may be viewed in the well-known way. The rear member (2) is also provided in opposite walls with apertures (34) to receive a winding key or keys, as hereinafter described. It will be understood that the plates (28) and (30) are forced into member (2), after which member (2) is placed over the sleeve (3) and slid upwardly until it engages the member (1), thus making a compact and light-tight construction, which can nevertheless be separated readily to give access to the interior for the placing and replacing of film rolls, or for the removal of the lens board (20) to replace with a lens of different focal length, or for cleansing the lens or any other purpose which may make it desirable to have access to the interior.

The camera is provided with suitable means for supporting a film roll, causing the film to travel for the purpose of exposing different portions thereof, and I prefer to mount the film roll, or rolls, in the rear end of the sleeve (3) as shown in the drawings. To this end the sleeve is provided in two opposite walls with two pairs of alined apertures (35—35) each of which preferably has a recess surrounding it in the outer face of the sleeve. I also provide a number of center pins, indicated at (36) having stems to engage the holes in the film spool and a flat head which may occupy the recess surrounding one of the holes (35) so as to be flush with the outer surface of the sleeve and permit the member (2) to pass over the same. In order to wind the film I employ preferably a winding plate (37), shown in Fig. (8), with a reduced bearing portion (38) adapted to engage one of the holes (35) in the sleeve, and is cut away at the other extremity, as indicated at (39) so as to not interfere with the insertion of one of the pins (36) in the other end of a spool. This winding plate is of such width as to preclude its turning within the shank of the spool, and it coöperates with a suitable key, one form of which is shown in detail in Fig. (9) and comprises a head (40) having roughened or milled edges and a split stem which is adapted to be passed through one of the apertures (34) in the rear section (2) of the camera and the aperture (35) in the sleeve, and to extend through the central aperture in the spool on opposite sides of the winding-plate (37) as indicated in Fig. (13), so that the winding-plate and the spool can be rotated from the outside of the camera by turning the milled head (40), while no light rays will be permitted to enter the camera. I also prefer to provide the rear member (2) with surface recesses indicated at 34ª surrounding each of the apertures (34) so that the head (40) of the winding-plate will be flush with the exterior surface of the camera. In using the camera it is only necessary to use a single spool of film such as is furnished by manufacturers at the present time, and generally referred to as a film spool or film cartridge. In such case the loaded spool will be placed within the rear end of the sleeve (3) and secured in position by inserting one of the pins (36) through each of alined apertures (35). A portion of the paper backing is then unrolled from the spool and carried to the other side of the sleeve where it is wound on the winding-plate (37), the bearing portion (38) of which is then placed in engagement with one of the apertures (35) of the other series, a center pin being inserted in the other aperture, the rear section (2) being then placed in operative position and the key (40) pushed into engagement with the winding-plate. The engagement of the key with the winding plate and the turns of the paper backing around the latter will serve to hold the winding device so that the entire film can be removed from the spool to the winding-plate as sections thereof are exposed. If an empty spool is used on which to wind the film, the winding-plate (37) is first inserted in the spool with the bearing portion (38) projecting therefrom. The end of the paper is made fast in the usual manner to the spool and the spool is inserted in the sleeve with the projection (38) in one hole (35) and pin (36) being inserted through the opposite hole 35) into the other end of the spool, as indicated in Fig. (8).

Obviously, each of the spools may be provided with a winding-plate (37) and key (40) so that after one or more exposures have been made the entire film can be rolled either forward or backward so as to thorouly protect it from dust, light and atmospheric conditions within the camera until the next exposure is to be made, and this also permits of the separation of the parts of the camera at any time after the insertion of a film and before it is completely exposed by simply rolling all of the film onto a single spool, it being only necessary for the operator to remember the number on the back of the paper backing, which indicates the next exposure.

In order to prevent the film and its paper backing from unrolling by reason of its inherent elasticity, and causing a rotation of the spool, I prefer to provide the interior of the sleeve (3), as shown in Figs. (1) and (2), with a pair of light friction brakes, indicated at (42) which may be simply thin sheets of cardboard, metal or other similar material, hinged or secured along one edge to the wall of the sleeve and pressed outwardly by suitable light springs (43), the said plates (42) being preferably of substantially the width of the film and engaging the exterior of the paper backing of the film on each roll or spool. These brakes may in some instances be omitted, however. I also prefer to so locate the holes (35) in the sleeve that the peripheral portions of the disks at each end of the spools will frictionally engage the adjacent walls of the sleeve and of the rear plate (28). It will also be seen that the film in passing from one spool to the other will be flattened by its engagement with the plate (28), which also exerts a light friction on the film. The friction on the paper backing of the film produced in either or all of the ways before described will naturally hold the film in any position to which it is moved, and will hold the portion to be exposed in front of the lens in a plane perpendicular to the axis of the lens (see Fig. 1). It will be obvious that by the means already described the film may readily be rolled in either direction by the winding device so as to be wound up entirely on one spool or the other if it is desired to open the camera.

As before stated, I prefer to provide in connection with my improved camera a composing device, which in this instance consists of a box or case (50), which fits the exterior of the camera with a sliding fit and is provided at one end with an eye aperture (51) and at the other end with a view-determining aperture coöperating therewith, indicated at (52). In this instance the aperture (52) is formed in a cover (53) detachably secured to the case (50), the whole constituting, if desired, a carrying case for the camera. By removing the camera from this composing device and placing the eye at the aperture (51) and looking through the view-determining aperture (52) the operator will see exactly the view which would be within the scope of the lens of the camera if held in the same position, and this composing device can therefore be held in the hand and used for selecting artistic bits of landscape and otherwise determining the portions of a picture which it is desired to photograph. I also provide the composing device with means by which it can be attached to a tripod. In this instance a threaded aperture (54) is provided in one or more of the walls of the composing device to receive the screw (55) of an ordinary tripod (56). In using this composing device in connection with a tripod or other support, after it has been adjusted to and secured in the position which delimits the desired portion of landscape or other picture to be photographed, the camera is inserted in the view-determining device and the shutter operated to make an exposure through the lens, thereby photographing the identical selected view. The ability to study by means of this composing device portions of a landscape and to cut off and isolate particular portions until the desired artistic effect is selected, will add greatly to the artistic quality of the pictures produced by the operator and will be appreciated by all those skilled in the art. The use of my improved convex mirror finder is a great improvement over those reflecting a lens image in that the rays of light are directly reflected to the eye, but in using such mirror the image is greatly reduced in size, whereas by the use of the composing device no diminution in the size of the objects viewed is apparent and the selected portions of the landscape may be viewed in their normal size.

In Fig. 11 I have shown one form of spacing sleeve (60) which I may employ for the purpose of increasing the length of the camera body to accommodate a lens of greater focal length. This form of sleeve is provided with a reduced portion (61) which occupies the same position in the front member (1) that is normally occupied by the sleeve (3) and the part (60) is provided with an interior recess indicated at (62) to receive and fit over the forward end of the normal sleeve (3), thus increasing the length of the camera a greater or less extent according to the length desired. These spacing sleeves are made up with special reference to the camera and long focus lens with which they are to be used and can be folded flat when not in use.

In Fig. 10 I have shown a modification of the shutter mechanism in which the exposing shutter here indicated at (70) is mounted on a fiber plate (70ª) to oscillate on a pivot eyelet or pin (71) instead of moving in a straight line. The shutter (70) consists therefore in this instance of a segmental plate provided with a suitable aperture (72) and a setting pin or handle (73) extending through the grooved slot (74) in the front of the camera. By means of pin (73) the shutter (70) can be moved past the lens in either direction by hand to give an exposure of greater or less extent. I also prefer to provide this shutter with a locking and releasing device in case it is desired to operate it instantaneously, and also for locking it in closed position. In this instance this locking and releasing device consists of a pivoted plate (75) having a struck-up projection (76) extending through the slot (77) in the front of the camera and provided at one end with a stop projection (78) for engaging the edge of the segmental shutter plate (70), and with a projecting portion (79) in the plane of the plate (75) to overlie the shutter plate and prevent the accidental disengagement of the parts. By moving the plate (75) outwardly to the limit of slot (77) the stop projection (78) will disengage the shutter plate and permit it to be swung from one extreme of movement to the other. By placing a rubber band indicated at (80) around the projection (76) and the setting pin or handle (73) the shutter can be operated instantaneously, the speed imparted to the shutter depending on the strength of the rubber band, and the rubber band will also hold the locking and releasing device normally in locked position.

Fig. 12 shows a film holding unit which may be advantageously employed in connection with my improved camera. This unit consists of a light frame of cardboard, consisting of a back-plate (81) and top and bottom flanges (82) between which the rolls indicated at (83) are revolubly mounted in any desired manner, as for example, by means of winding-plate (37) and pins (36) as indicated in Fig. (8). In connection with this frame and rolls is a flat plate (84) of cardboard, the end portions of which engage frictionally the exterior surfaces of the rolls or spools, the central portion being provided with an opening (85) of substantially the size of the picture to be projected on the film. The back-plate (81) is provided with a central aperture (86) through which the numeral on the paper backing may be viewed through the window in the back of the mirror. The plate (84) is held in frictional engagement with the rolls by a pair of light rubber bands, indicated at (87) and will thus exert sufficient tension on the rolls to prevent the film from unwinding and also to hold the film in any position while permitting it to be wound on either roll and in either direction. This film unit will be found very convenient especially for use in connection with this camera as it facilitates the insertion of the film spools therein as it can be simply inserted in the rear end of sleeve (3), the winding key (40) or winding keys being inserted after the rear member (2) has been placed on the sleeve. This roll unit will be prepared at the manufacturers and constitute a new form in which the film can be merchandized. Obviously, where this film unit is employed the brakes (42) on sleeve (3) can be omitted. I may provide the rear wall of the rear member (2) with two apertures, indicated at (33ª) and (33ᵈ) (see Fig. 12), provided with non-actinic windows, and being arranged on opposite sides of a central position, as indicated in dotted lines in Fig. (4), in which case the plate (30) of the camera would be provided with two of such windows registering with the apertures in the member (2) and the plate (28) would be provided with two apertures instead of one. By the use of these double windows a film may be used having the greatest diameter of the exposed portions as marked on the paper back disposed transversely to the greatest diameter of the picture as made by the camera, and two exposures may be made in the camera for each indicated exposure on the roll. For example, if the numeral on the roll is moved into registration with the first window (as 33ª), one-half of the film surface indicated by this number can be exposed and by moving the film until the numeral comes to the window (33ᵇ) the other half of the indicated film surface can be exposed. This makes it possible to use a film marked for exposure say, 4x5, for a double number of exposures 2½x4, etc., and especially in the small size cameras would enable the operator, by purchasing a film marked for an exposure twice the size of the camera, to load the film with a larger number, as two dozen exposures.

Where a film unit such as is shown in Fig. (12) is employed the back plate (81) may be provided with additional apertures (33ᶜ) and (33ᵈ) to register with the apertures (33ª) and (33ᵇ) in the member (2) of the camera.

In Fig. 14 I have shown diagrammatically one form of my improved camera in which the sleeve and one of the members, either the front member or the rear member, are merged into a single part so that in this form the camera will consist of two parts (1ª) and (2ª), one fitting over the other, each open at one end and closed at the other. In this instance the inner member (1ª) has its closed end provided with a lens and its open end provided with the film supporting rolls or spools indicated in dotted lines in Fig. 14, while the closed end of the end closing member or rear member (2ª) is provided with the non-actinic window. Obviously in this two-part type the film unit shown in Fig. 12 could be conveniently employed in the rear member (2ª), but in either case the film would be supported within the confines of the member (2ª). I therefore desire it to be understood that in referring to connecting sleeve in the following claims I contemplate a construction which may comprise only two parts, the connecting sleeve being merged into one or the other members of the camera.

In any or all of the forms of camera, within the scope of my invention in which it is agreeable, the image within the camera may be focused by moving one member with respect to the other, and I provide an indicator, which consists of a piece of paper or other material having a scale marked thereon and which is preferably applied to an inclosed portion or member, as the sleeve (3) in Fig. (4) in which the indicator is shown at (90). The scale will coöperate with an edge of the rear or inclosing member.

The camera herein described can obviously be made up in various forms from the most inexpensive to more elaborate, simply by the selection of materials of different grades, the construction being the same, and they will be found on account of their cheapness and wide range of utility particularly desirable for educational purposes.

What I claim and desire to secure by Letters Patent is:

1. A photographic camera comprising front and rear members, each open at one end and closed at the other, a connecting sleeve fitting both of said members, at least one of said members being movable with respect to said sleeve to open the camera, the front member being provided with a lens, means located within the confines of the rear member when in closed position, for supporting a photographic surface in focal relation with the lens, and means located outside of the rear member and extending therethrough for moving said sensitive surface into and out of focal relation with the lens.

2. A photographic camera comprising front and rear members, each open at one end and closed at the other, a connecting sleeve fitting both of said members, at least one of said members being movable with respect to said sleeve to open the camera, the front member being provided with a lens, means operatively connected with said sleeve for supporting a sensitive surface in focal relation to the lens, and means located outside of the rear member and extending therethrough, and through said sleeve, for moving said sensitive surface into and out of focal relation with the lens.

3. A photographic camera comprising front and rear members, each open at one end and closed at the other, a connecting sleeve fitting both of said members, at least one of said members being movable with respect to said sleeve to open the camera, the front member being provided with a lens, means for supporting a roll of film within the camera, within the confines of said rear member, and means for effecting the travel of said film in both directions, whereby the film may be rolled into light-tight position at any time to permit the separation of the front and rear members to give access to the interior of the camera, and to protect the film.

4. A photographic camera comprising front and rear members, each open at one end and closed at the other, and a connecting sleeve fitting each of said members, at least one of said members being movable with respect to the sleeve, said front member being provided with a guiding slot and a lens aperture, an exposing shutter consisting of a plate having an angularly disposed guiding and actuating projection adapted to engage said slot, a partition plate fitting said front member in rear of shutter and holding said projection in engagement with said slot, a lens in said front member in alinement with the lens aperture thereof, and means for supporting a sensitive surface in focal relation to the lens within the camera.

5. A photographic camera comprising front and rear members, each open at one end and closed at the other, and a connecting sleeve fitting each of said members, at least one of said members being movable with respect to the sleeve, said front member being provided with a lens opening and with guiding slots, an exposing shutter consisting of a plate engaging the inner face of the closed end of said front member and having an actuating projection extending through one of said slots, a locking and releasing plate having a part coöperatively engaging the shutter for holding it in set position, and having a projection engaging another of said slots, a partition plate in said front member for holding said shutter and locking plate in operative relation with said front member, a lens supported in said front member, and means within the camera for supporting a sensitive surface in focal relation to the lens.

6. A photographic camera comprising front and rear members, each open at one end and closed at the other, and a connecting sleeve fitting each of said members, at least one of said members being movable with respect to the sleeve, said front member being provided with a lens opening and with guiding slots, an exposing shutter consisting of a plate engaging the inner face of the closed end of said front member and having an actuating projection extending through one of said sleeves, a locking and releasing plate having a part coöperatively engaging the shutter for holding it in closed position, and having a projection engaging another of said slots, a partition plate in said front member for holding said shutter and locking plate in operative relation with said front member, an elastic device engaging the actuating part on the shutter and the projection on the locking and releasing plate, a lens supported within the front member, and means within the camera for supporting a sensitive surface in focal relation with the lens.

7. A photographic camera comprising front and rear members, each open at one end and closed at the other, the closed end of the front member being provided with a lens aperture and a plurality of slots, a safety shutter, an exposing shutter and a locking and releasing device for the latter, each comprising flat plates provided with projections for engaging one of said slots, a partition plate fitting said front member and frictionally engaging the lateral walls of the same for holding said plates in operative relation with the front member, means for supporting a lens in said front member and means for supporting a sensitive surface within the camera in focal relation to the lens.

8. A photographic camera comprising front and rear members, each open at one end and closed at the other, a connecting sleeve open at both ends, fitting and frictionally engaging said front and rear members, a plate frictionally engaging the lateral walls of one of said members and having reduced portions extending into and frictionally engaging said sleeve to hold the sleeve in position within said member and to assist in making the camera light-tight.

9. A photographic camera comprising front and rear members, each open at one end and closed at the other, a connecting sleeve open at both ends frictionally fitting each of said members, said front member having a lens aperture and a guiding slot in its front wall, an exposing shutter comprising a plate having a guiding and actuating projection extending through said slot, a plate frictionally engaging the lateral walls of said front member and holding said shutter in operative position, said plate having a lens in alinement with said lens opening, means for supporting film carrying spools within the confines of said rear member, and means located outside of said rear member and having portions extending therethrough for operating said film spools.

10. A photographic camera comprising front and rear members, each open at one end and closed at the other, the front member being provided with a lens and the rear member being provided with an observation window, a connecting sleeve fitting each of said members, the rear member being movable with respect to the sleeve, spool engaging devices adapted to fit apertures in the sleeve and held in operative position by the inclosing walls of the rear member, said rear member being provided with one or more apertures in alinement with apertures in the sleeve to receive a winding key, and a winding key.

11. A photographic camera comprising front and rear members, each open at one end and closed at the other, a connecting sleeve fitting both of said members, a lens supported in the front member, spool supporting devices within the confines of the rear member including a winding-plate adapted to extend through a spool, and a winding key having a split stem adapted to pass through an aperture in the rear member and engage said winding-plate on opposite sides.

12. A photographic camera comprising front and rear members, each open at one end and closed at the other, a connecting sleeve adapted to fit each of said members, a lens supported within the front member, means for supporting a sensitive surface within the confines of the rear member, and a spacing sleeve having a portion adapted to fit within one of said members, and a portion to fit over said connecting sleeve to increase the focal length of the camera.

13. In combination with a camera comprising front and rear members, each open at one end and closed at the other, one having a connecting portion fitting the other, said front member being provided with a lens, and a film unit adapted to be supported within the confines of the rear member and comprising a frame and two supporting spools rotatably mounted thereon and carrying the film, and means for preventing accidental unwinding of the film from said spools, a winding device adapted to extend through the rear member for rotating one or other of said spools.

14. In combination with a camera comprising front and rear members, each open at one end and closed at the other, one having a connecting portion fitting the other, said front member being provided with a lens, and a film unit adapted to be supported within the confines of the rear member and comprising a frame and two supporting spools rotatably mounted thereon and carrying the film, a friction plate having portions for engaging said spools, elastic devices engaging said plate and forcing it into engagement with said spools, and a winding device adapted to extend through said rear member and engage one or other of said spools.

15. A camera comprising front and rear members, each open at one end and closed at the other, a connecting sleeve fitting said members, a lens carried by the front member, means for supporting film spools within the confines of the rear member, winding mechanism for said spools, and a friction brake within the camera engaging each of said spools whereby the film may be entirely wound on either of said spools to protect the film and to permit the separation of the parts of the camera.

In testimony whereof I affix my signature.

ERNEST HOWARD FARMER.